(12) United States Patent
Tarlton et al.

(10) Patent No.: US 9,201,767 B1
(45) Date of Patent: Dec. 1, 2015

(54) SYSTEM AND METHOD FOR IMPLEMENTING A TESTING FRAMEWORK

(71) Applicant: Nationwide Mutual Insurance Company, Columbus, OH (US)

(72) Inventors: Barry Patrick Tarlton, Waverly, OH (US); Michael Wayne Frayer, Columbus, OH (US); Eric Michael Chin, Plain City, OH (US); Cortez Crosby, Dublin, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 161 days.

(21) Appl. No.: 14/138,203

(22) Filed: Dec. 23, 2013

(51) Int. Cl.
*G06F 11/00* (2006.01)
*G06F 11/36* (2006.01)

(52) U.S. Cl.
CPC ........ *G06F 11/3672* (2013.01); *G06F 11/3668* (2013.01)

(58) Field of Classification Search
CPC .......................... G06F 11/3668; G06F 11/3672
See application file for complete search history.

(56) References Cited

U.S. PATENT DOCUMENTS

| | | | |
|---|---|---|---|
| 7,694,140 B1* | 4/2010 | Sachenko et al. | 713/170 |
| 8,984,490 B1* | 3/2015 | Dahan | 717/127 |
| 2004/0243338 A1* | 12/2004 | Sabiers et al. | 702/122 |
| 2005/0010661 A1* | 1/2005 | Southam et al. | 709/224 |
| 2005/0021276 A1* | 1/2005 | Southam et al. | 702/122 |
| 2005/0027853 A1* | 2/2005 | Martin et al. | 709/224 |
| 2007/0240102 A1* | 10/2007 | Bello et al. | 717/104 |
| 2010/0057403 A1* | 3/2010 | Vecera et al. | 702/186 |
| 2011/0161929 A1* | 6/2011 | Keating | 717/120 |
| 2012/0054532 A1* | 3/2012 | Vecera et al. | 714/2 |
| 2012/0266135 A1* | 10/2012 | Mansour et al. | 717/124 |
| 2013/0018703 A1* | 1/2013 | Majeed et al. | 705/7.38 |
| 2014/0007050 A1* | 1/2014 | Belisario et al. | 717/113 |
| 2014/0317600 A1* | 10/2014 | Klunder et al. | 717/124 |
| 2015/0074647 A1* | 3/2015 | Levi | 717/124 |

OTHER PUBLICATIONS

Ken Ueno, Michiaki Tatsubori, Early Capacity Testing of an Enterprise Service Bus. In Proceedings of the 2006 IEEE International Conference on Web Services (ICWS 2006), 709-716, Sep. 2006.*

* cited by examiner

*Primary Examiner* — Joshua P Lottich

(57) ABSTRACT

A system and method for implementing a testing framework including a testing unit that receives test instructions; generates a mock consumer request for a web service from a web server and a mock provider response based on the test instructions; transmits the mock consumer request to a tested unit; receives a modified consumer request from the tested unit; and transmit the mock provider response to the tested unit.

21 Claims, 5 Drawing Sheets

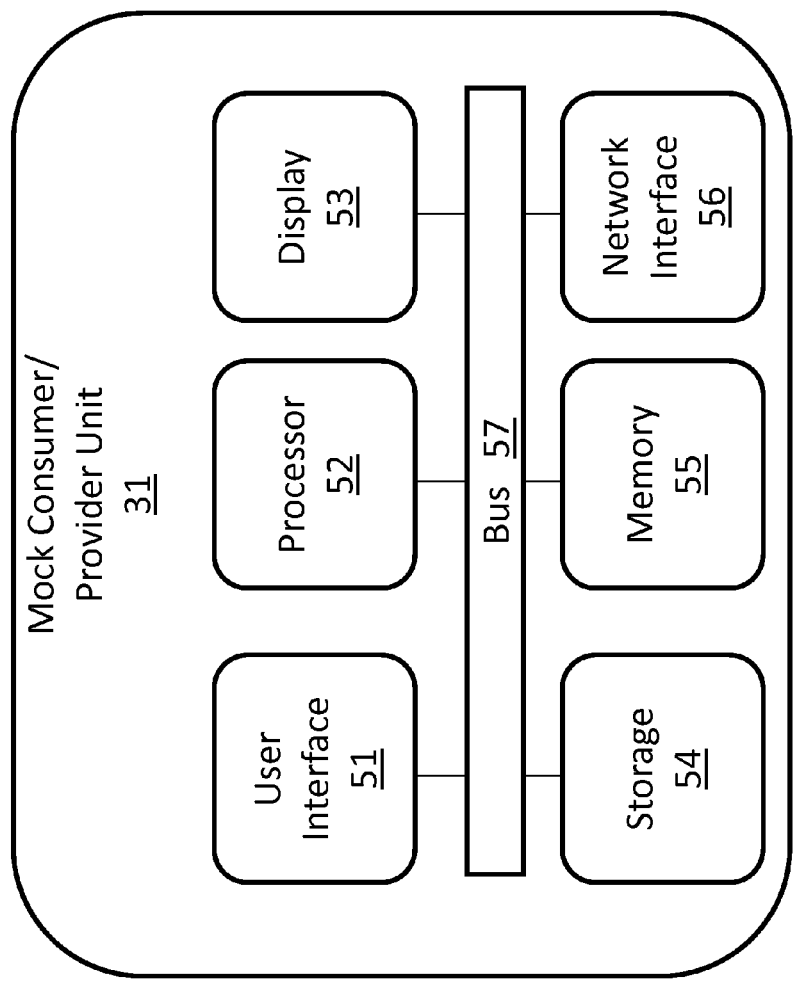

SYSTEM AND METHOD FOR IMPLEMENTING A TESTING FRAMEWORK

FIELD OF THE INVENTION

The systems and described herein relate to manual or automated unit testing of devices and/or software packages that are installed or configured in computing devices that interact with both consumer and provider devices.

BRIEF SUMMARY OF THE INVENTION

In one embodiment, there is a system comprising a testing unit, the testing unit including memory operable to store at least one program; at least one processor communicatively coupled to the memory, in which the at least one program, when executed by the at least one processor, causes the at least one processor to: receive test instructions; generate a mock consumer request for a web service from a web server and a mock provider response based on the test instructions; transmit the mock consumer request to a tested unit; receive a modified consumer request from the tested unit; and transmit the mock provider response to the tested unit.

In a further embodiment of the system, the mock consumer request includes a modified header, and wherein the modified header includes a port and Internet protocol address of the testing unit that generated the mock consumer request.

In a further embodiment of the system, the tested unit is adapted to extract the modified header information from the mock consumer request and wherein the modified request is received by the testing unit based on the modified header information.

In a further embodiment of the system, the at least one program further causes the at least one processor to generate a listener for the modified consumer request received from the tested unit.

In a further embodiment, the at least one program further causes the at least one processor to receive a modified provider response from the tested unit.

In a further embodiment of the system, the tested unit is an enterprise service bus.

In a further embodiment of the system, the at least one program further causes the at least one processor to generate a plurality of mock consumer requests and a plurality of mock provider responses based on the test instructions and a predefined data table.

In one embodiment, there is a method, comprising: receiving test instructions; generating a mock consumer request for a web service from a web server and a mock provider response based on the test instructions; transmitting the mock consumer request to a tested unit; receiving a modified consumer request from the tested unit; and transmitting the mock provider response to the tested unit.

In a further embodiment of the method, the mock consumer request includes a modified header, and wherein the modified header includes a port and internet protocol address of a testing unit that generated the mock consumer request.

In a further embodiment of the method, the tested unit is adapted to extract the modified header information from the mock consumer request and wherein the modified request is received by the testing unit based on the modified header information.

In a further embodiment of the method, the method further comprising: generating a listener for the modified consumer request received from the tested unit.

In a further embodiment of the method, the method further comprising: receiving a modified provider response from the tested unit.

In a further embodiment of the method, the tested unit is an enterprise service bus.

In a further embodiment of the method, the method further comprising generating a plurality of mock consumer requests and a plurality of mock provider responses based on the test instructions and a predefined data table.

In one embodiment, there is non-transitory computer readable storage medium having stored thereon computer-executable instructions which, when executed by a processor, perform a method, the method comprising: receiving test instructions; generating a mock consumer request for a web service from a web server and a mock provider response based on the test instructions; transmitting the mock consumer request to a tested unit; receiving a modified consumer request from the tested unit; and transmitting the mock provider response to the tested unit.

In a further embodiment of the non-transitory computer readable storage medium, the mock consumer request includes a modified header, and wherein the modified header includes a port and internet protocol address of a testing unit that generated the mock consumer request.

In a further embodiment of the non-transitory computer readable storage medium, the tested unit is adapted to extract the modified header information from the mock consumer request and wherein the modified request is received by the testing unit based on the modified header information.

In a further embodiment of the non-transitory computer readable storage medium, the method further comprising: generating a listener for the modified consumer request received from the tested unit.

In a further embodiment of the non-transitory computer readable storage medium, the method further comprising: receiving a modified provider response from the tested unit.

In a further embodiment of the non-transitory computer readable storage medium, the tested unit is an enterprise service bus.

In a further embodiment of the non-transitory computer readable storage medium, the method further comprising: generating a plurality of mock consumer requests and a plurality of mock provider responses based on the test instructions and a predefined data table.

BRIEF DESCRIPTION OF THE SEVERAL VIEWS OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIG. 5 depicts a block diagram of an exemplary testing unit according to at least one embodiment of the invention.

DETAILED DESCRIPTION OF THE INVENTION

Figure 1:
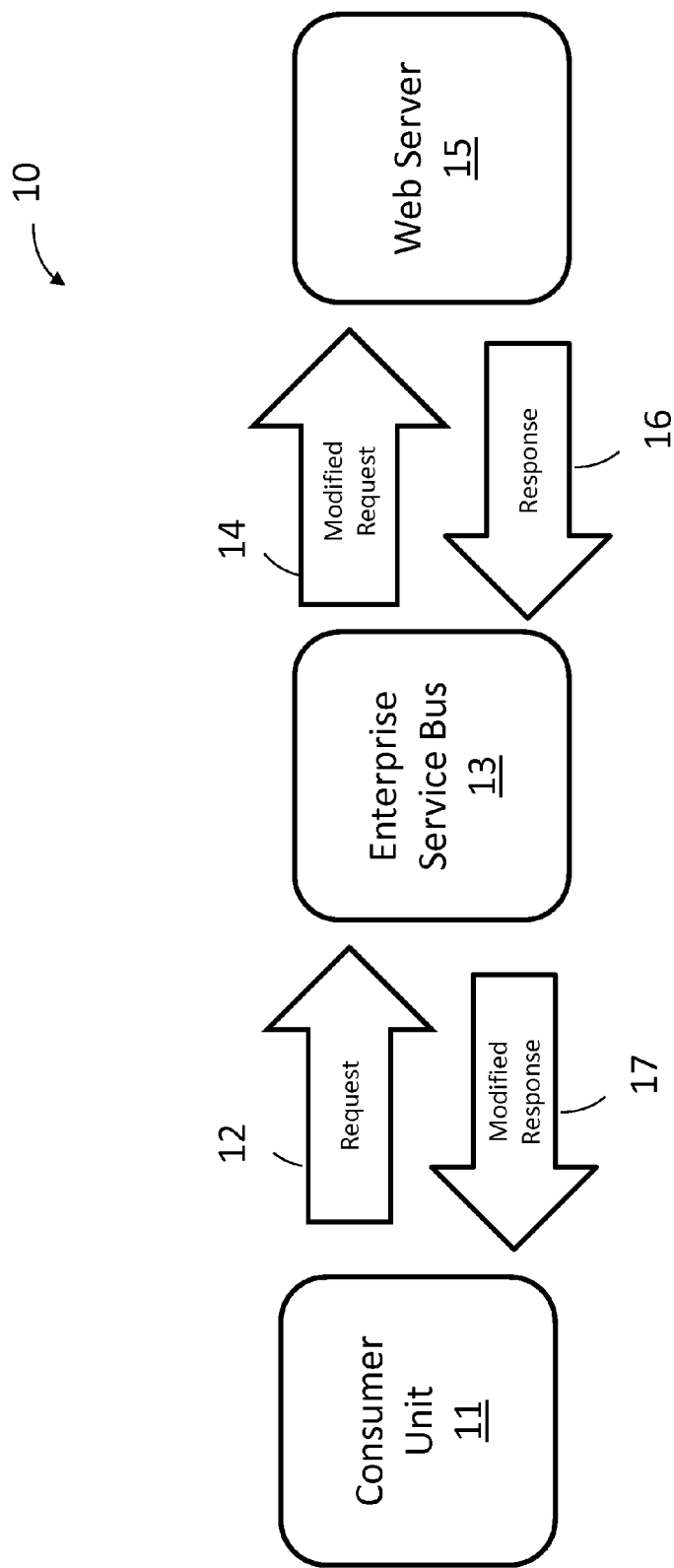
FIG. 1 depicts an exemplary enterprise service oriented architecture.

The test framework and process by which the framework accomplishes unit testing of an enterprise service bus is described in more detail below.

Referring to the drawings in detail, wherein like reference numerals indicate like elements throughout, there is shown in FIGS. 1-5 a system 30 and method 40, generally designated, in accordance with an exemplary embodiment of the present invention.

FIG. 1 depicts an exemplary enterprise SOA 10. As depicted in FIG. 1, the enterprise SOA 10 may include a consumer unit 11, an enterprise service bus 13 and a web server 15. The consumer unit 11, the enterprise service bus 13 and/or the web server 15 may be communicatively coupled or connected via a computer network (not shown). The computer network may be an intranet, the internet or World Wide Web and may use one or more protocols, such as transmission control protocol/internet protocol ("TCP/IP") to transfer data between each computing component, for example.

The consumer unit 11, the enterprise service bus 13 and/or the web server 15 may communicate via requests and responses using different network protocols, such as the hyper text transfer protocol ("HTTP"), or alternatively, a message queuing protocol for example.

In one embodiment, the enterprise service bus 13 is a software architecture used for facilitating interaction and communication between mutually interacting software applications being executed on two mutually exclusive computing components, such as one or more instances of the web server 15, and for processing service requests from the consumer unit 11, using, for example, an SOA. Additional benefits of the enterprise service bus 13 may include protocol and message transformation which is beneficial for modern platforms needing to communicate with legacy platforms or vice versa, and service composition which provides the ability to expose a single service to consumers which behind the scenes communicates with any number of disparate systems.

A SOA is a software architecture framework based on discrete pieces of software that provide application functionality as services. A service may be a self-contained logical representation of a repeatable function or activity. One example of a service on the enterprise service bus 13 is a credit card payment service which provides consumer systems with a single service interface to internal billing systems and an external vendor for credit card processing. Another example of a service on the enterprise service bus 13 is a customer information service which gives consumer systems a consistent service interface and single endpoint to query a company's customer information.

Services can be combined by other software applications that, together, provide the complete functionality of a large software application. One of the purposes of the SOA may be to allow easy cooperation of a large number of computers that are connected over a network. One or more computing components can execute and host an arbitrary number of services, and each service may be designed in a way that ensures that the service can exchange information with any other service on a given network without human interaction and without the need to make changes to the underlying program itself. The practice of SOA allows an organization to not merely focus on the best implementation of these services, but also on partnering information technology and business departments to identify and design the services needed by the organization in order to meet the organization's future service needs. SOA provides a benefit where services can be identified, designed and implemented in a manner that meets the needs of the entire organization, maximizing reuse and minimizing custom service implementations for different consumers.

In one embodiment, a provider, such as the web server 15 or an entity that implements the web server 15, may offer one or more services to the consumer unit 11. The consumer unit 11 may then generate requests for data using the services offered by the web server 15. In one embodiment, web server 15 may be a plurality of web servers, each with individual internet protocol addresses. In one embodiment, the consumer unit 11 may be one or more computing devices.

The consumer unit 11, the enterprise service bus 13 and/or the web server 15 may communicate using a simple object access protocol ("SOAP") message. SOAP is a protocol specification for exchanging structured information in web services architectures, such as enterprise SOA 10. SOAP may rely on an eXtensible Markup Language ("XML") information set for its message format. An XML information set may allow a user to describe an XML document as a series of objects with different properties.

In the enterprise SOA 10 depicted in FIG. 1, the consumer unit 11 may generate and transmit a request 12 for a web service performed by the web server 15 to the enterprise service bus 13.

The enterprise service bus 13 may then perform a transformation on request 12 to generate a modified request 14.

Next, the enterprise service bus 13 may call the web server 15 to perform a web service by transmitting a modified request 14 to the web server 15.

After receiving the modified request 14, the web server 15 may process the modified request 14 using one or more services running on the web server 15 and create a response 16 based on the results generated by the one or more services. The response 16 may then be sent back to the enterprise service bus 13.

Next, the enterprise service bus 13 performs a transformation on the response 16 before sending the modified response 17 back to the consumer unit 11.

Figure 2:
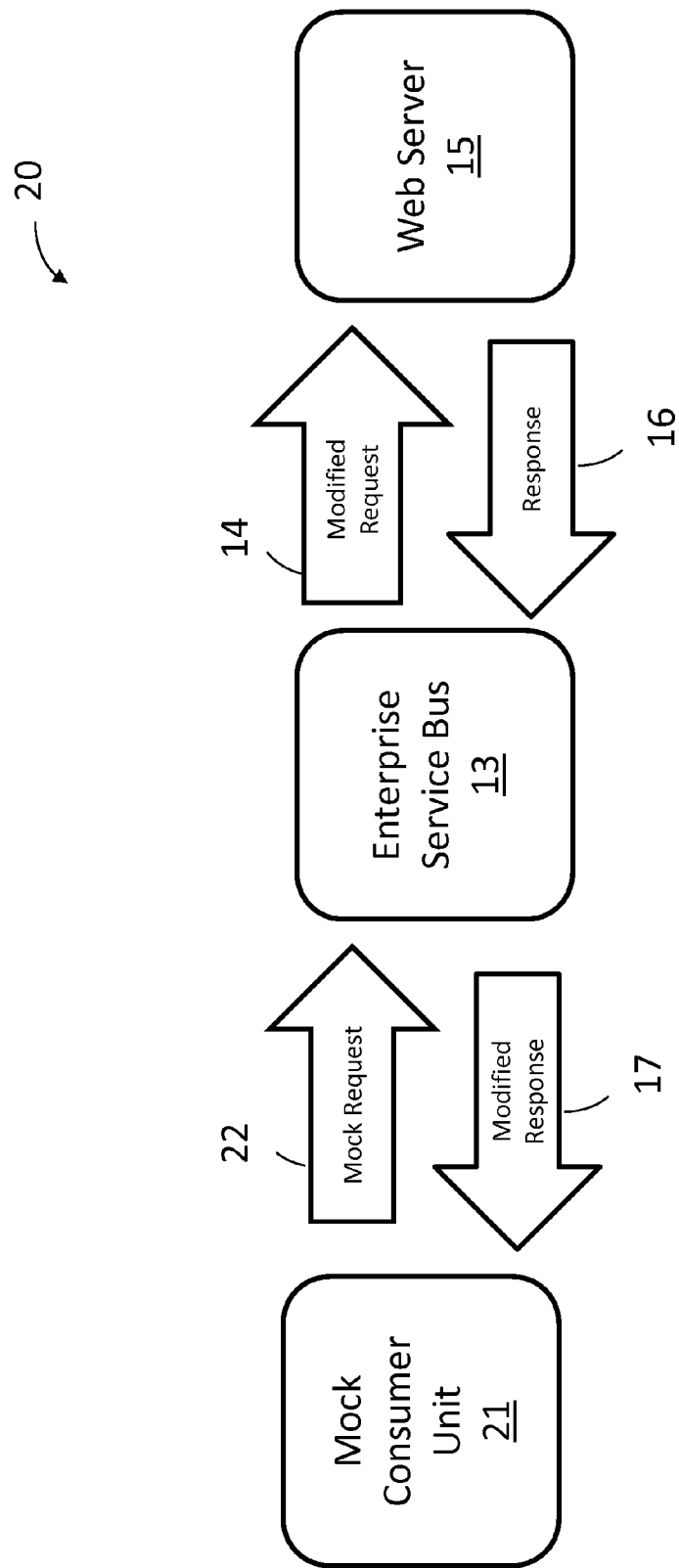
FIG. 2 depicts an exemplary system for testing the enterprise service oriented architecture.

FIG. 2 depicts an exemplary system 20 for testing the enterprise SOA. In this configuration, many of the components are similar to the components shown in FIG. 1. In addition, the components in FIG. 2 communicate in a similar manner as described above in the description for FIG. 1. However, in order to test the enterprise SOA, a mock consumer unit 21 simulates the requests transmitted from the consumer unit 11 to test the enterprise service bus 13 and the web server 15. To perform the test, the mock consumer unit 21 transmits a mock request 22 to the enterprise service bus 13 and waits for the modified response 17 from the enterprise service bus 13. Depending on the contents of the modified response 17, the mock consumer unit 11 can determine whether an error occurred in the enterprise SOA.

However, while system 20 can provide testing capabilities for an enterprise SOA, in the event that an error is generated, the mock consumer unit 11 cannot determine whether the error occurred on the enterprise service bus 13 or the web server 15. The inability of the mock consumer unit 11 to identify where an error occurs results from the fact that the mock consumer unit 11 cannot monitor the data exchanges between the enterprise service bus 13 and the web server 15 to determine which component is generating incorrect data. Another challenge in testing enterprise service bus 13 platforms is that one cannot guarantee a consistent response from the web server 15 (e.g. provider) of the service. For example, some services are time based, or are connected to backend databases where the data is in constant flux. This makes it difficult to create repeatable automated tests because the response one receives may vary based on uncontrollable conditions. The ability to control what the web server 15 (e.g. provider) returns to the enterprise service bus 13 provides the capability to define a repeatable test once that can be executed with confidence in an automated manner rather than manual testing. Therefore, it is be beneficial to provide a testing framework capable of testing each component of the enterprise SOA, individually.

Figure 3:
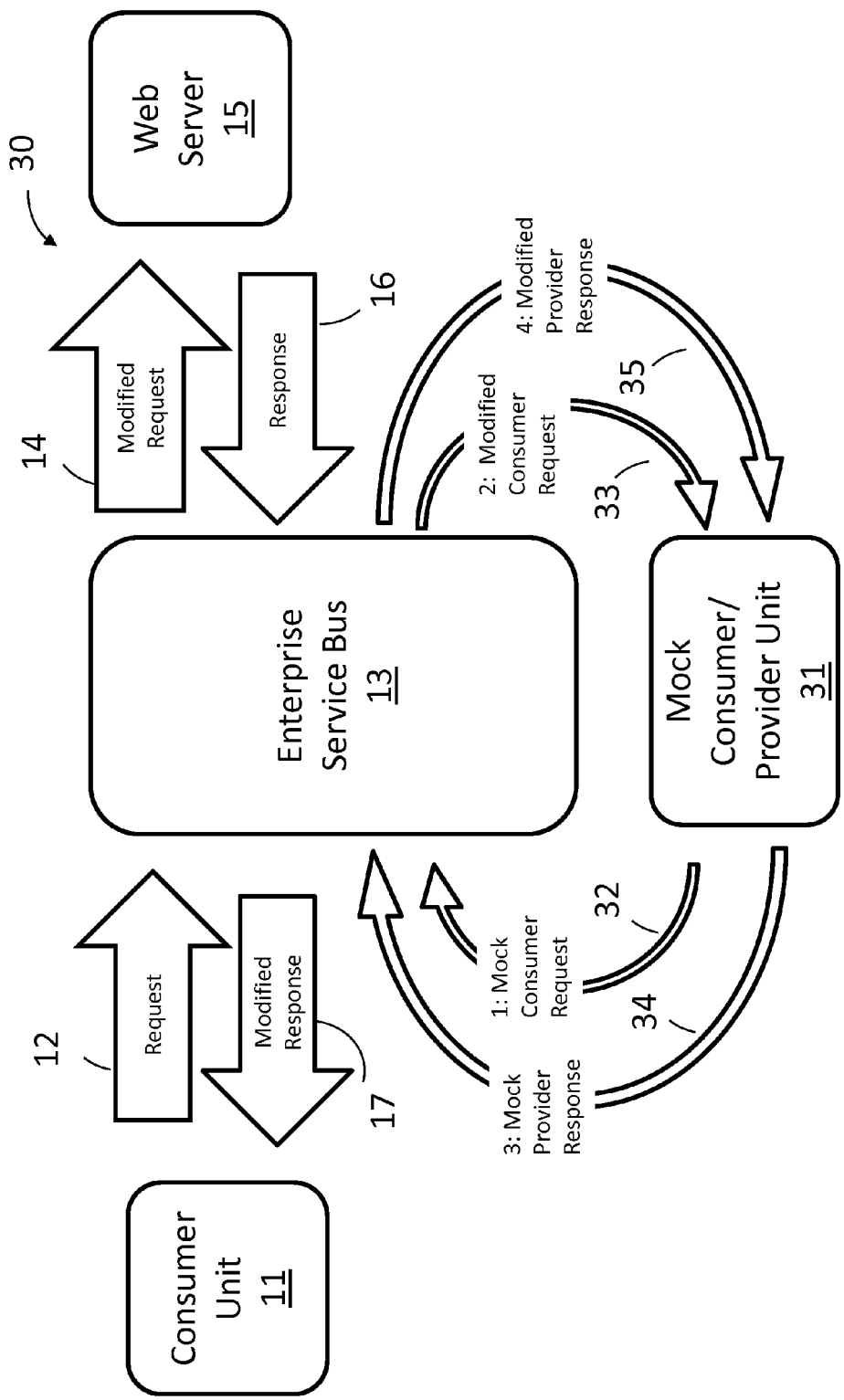
FIG. 3 depicts an exemplary system for testing a computing component of the enterprise service oriented architecture that communicates with a consumer and at least one provider of the enterprise service oriented architecture network, according to at least one embodiment of the invention.
Figure 4:
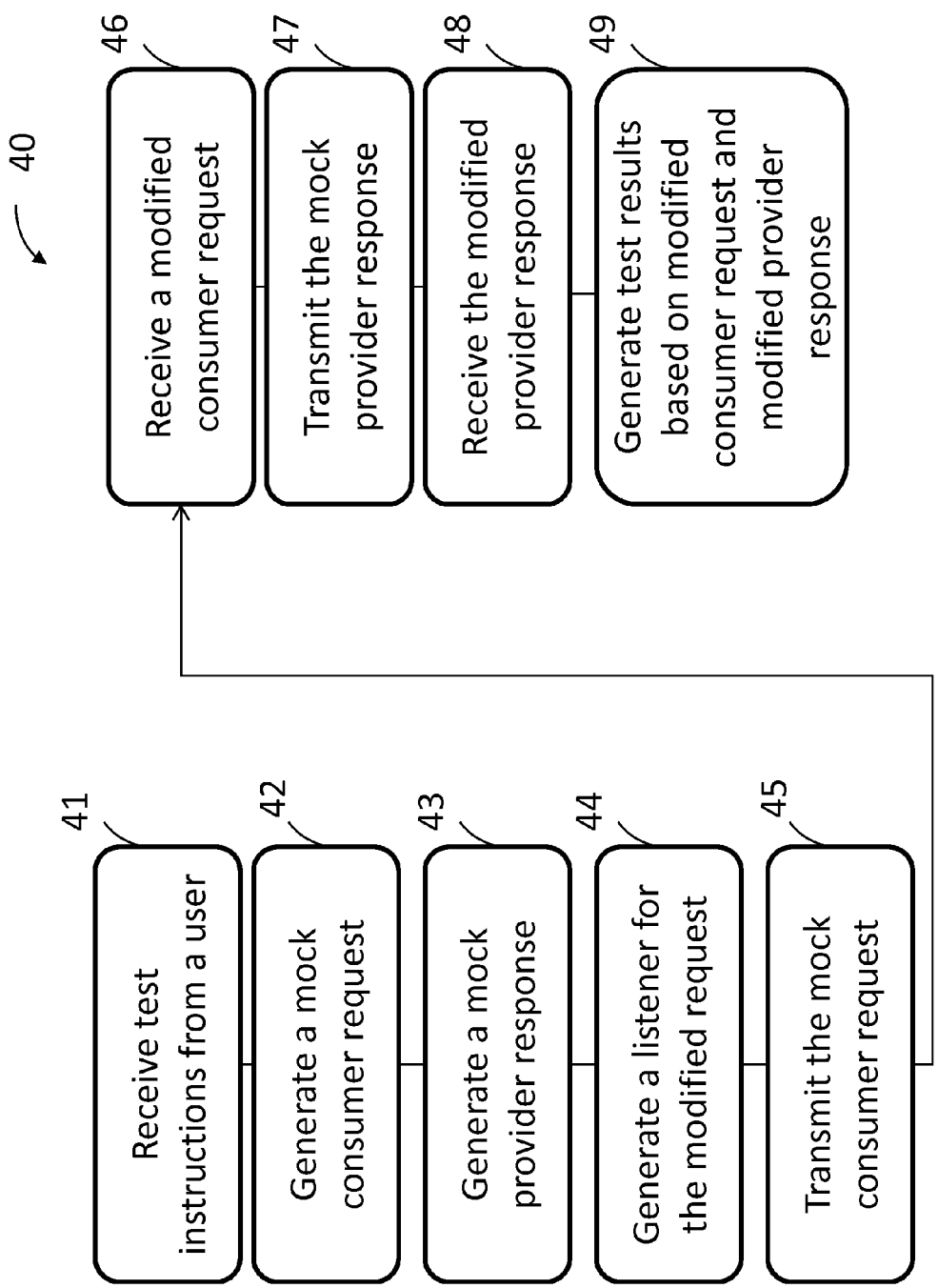
FIG. 4 depicts an exemplary method for testing one computing component of the enterprise service oriented architecture ("SOA") that communicates with a consumer and at least one provider of the enterprise SOA network, according to at least one embodiment of the invention.

FIGS. 3 and 4 depict a system 30 and method 40 for testing a computing component (e.g. a tested unit). In one embodiment, the computing component may be the enterprise service bus 13 that is adapted to communicate with a consumer computing component, such as the consumer unit 11, and at least one provider computing component, such as the web server 15. To test the enterprise service bus 13, the system 30 may include a mock consumer/provider unit 31 (e.g. a testing unit). The mock consumer/provider unit 31 may simulate requests and responses from both the consumer unit 11 and the web server 15, thereby allowing for a user to test the enterprise service bus 13 individually and identify errors attributable to the enterprise service bus 13.

Before mock consumer requests and mock provider responses are exchanged with the enterprise service bus 13, in step 51, the mock consumer/provider unit 31 may first receive test instructions from a user (e.g. a test administrator) to initiate a test of the enterprise service bus 13. The test instructions may include simulated data included with the mock consumer requests and mock provider responses to transmit to the enterprise service bus 13. The test instructions may also include validation data that may be compared to the data in the messages (e.g. modified consumer requests and modified provider responses) received from the enterprise service bus 13 to determine if the enterprise service bus 13 is transmitting correct modified consumer requests and modified provider responses.

At steps 42 and 43, the mock consumer/provider unit 31 may review the test instructions and generate a mock consumer request 32 and a mock provider response 34 (described in more detail below). The mock consumer request 32 may be in an XML name space format such as the example below:

Mock Consumer Request (XML Name Space Format):
<policySearch>
  <Customer>
    <FName>John</FName>
    <LName>Smith</LName>
    <POLNum>123456</POLNum>
  </Customer>
</policySearch>

In one embodiment, an enterprise service bus 13 includes one or more "end points," or input ports, on the enterprise service bus 13 used for processing requests from the consumer unit 11 and transmitting the requests to one or more web servers, such as web server 15 based on which end point received the request. Each end point on the enterprise service bus 13 may correspond to one or more different web servers that can appropriately process a request from a consumer. Each end point may be assigned an internet protocol address, which is identified by the consumer unit 11 or mock consumer/provider unit 31 in a header of request 12 or mock consumer request 32. An end point on the enterprise service bus 13 may be assigned to mock consumer/provider unit 31, meaning any requests received at this end point will be automatically directed to mock consumer/provider unit 31.

In an alternative embodiment, the mock consumer request 32 includes a modified header that identifies both i) an end point internet protocol address corresponding to an end point on the enterprise service bus 13 and ii) a port and internet protocol address of the mock consumer/provider unit 31. If a modified header is included in a mock consumer request 32, the enterprise service bus 13 would refrain from transmitting a modified consumer request 33 to a web server 15 that corresponds to the end point where the mock consumer request 32 was received and instead transmit a modified consumer request 33 to mock consumer/provider unit 31.

An example of a modified header is as follows:
Header: http://esb.nwie.net/services/policy
sutf-header: http://10.1.2.12:8080/service In the above example, "Header:" identifies the end point of the enterprise service bus 13 and "sutf-header" identifies the port and internet protocol address of the mock consumer/provider unit 31.

By utilizing the modified header, the enterprise service bus 13 may also continue to receive request 12 and response 16 from the consumer unit 11 and the web server 15, respectively, and provide modified requests 14 and modified responses 17, while also receiving mock consumer requests 32 and mock provider responses 34 from the mock consumer/provider unit 31.

Next, at step 44, the mock consumer/provider unit 31 may assign an input port (i.e. a "listener") connected to a network to monitor for reception of a modified request 33 from the enterprise service bus 13. In one embodiment, mock consumer/provider unit 31 includes an HTTP listener that monitors and responds to HTTP requests.

At step 45, the mock consumer/provider unit 31 may transmit the mock consumer request 32 to the enterprise service bus 13 or an end point associated with the enterprise service bus 13 based on end point or enterprise service bus 13 uniform resource locator internet protocol address specified in the mock consumer request 32.

After receiving the mock consumer request 32, the enterprise service bus 13 will then process the mock consumer request 32 and perform a transformation on the mock consumer request 32 to create a modified consumer request 33. In one embodiment, the enterprise service bus 13 receives the mock consumer request 32 in XML name space format and converts the mock consumer request 32 into XML name space or name-value format for processing by mock consumer/provider unit 31.

In one embodiment, the modified consumer request 33 may be in an XML name space format, such as the example below:

Modified Consumer Request (XML Name Space Format):
<polSearch>
  <CustData>
    <name>John Smith</name>
    <policy>12-34-56</policy>
  </CustData>
</polSearch>

In another embodiment, the modified consumer request 33 may be in an XML name value pair format, such as the example below:

Modified Consumer Request (Name-Value Pair Format):
<polSearch>
  <Data>
    [Customer]
    name=John Smith
    policy=12-34-56
  </Data>
</polSearch>

In one embodiment, the enterprise service bus 13 may be adapted to extract modified header information from mock consumer request 32. Based on the extracted modified header information, the enterprise service bus 13 may re-route the modified consumer request 33 to a different location (e.g. the mock consumer/provider unit 31) than originally intended (e.g. the web server 15). In one embodiment, the enterprise service bus 13 may re-route the modified consumer request 33 to a different location based on a port number and internet protocol address in the modified header. In one embodiment, the enterprise service bus 13 may search for a certain flag in the mock consumer request 32 modified header. The certain flag directs the enterprise service bus 13 to send its modified consumer request 33 to the mock consumer/provider unit 31 instead of the web server 15. This functionality enables the enterprise service bus 13 to communicate with the actual provider (e.g. the web server 15) or the test framework (e.g. the mock consumer/provider unit 31).

At step 46, the mock consumer/provider unit 31 may receive the modified consumer request 33 from the enterprise service bus 13. In one embodiment, the previously executed "listener" on the mock consumer/provider unit 31 may perform the function of receiving the modified consumer request 33.

At step 47, after receiving a modified consumer request 33, the mock consumer/provider unit 31 may transmit the mock provider response 34 to the enterprise service bus 13. The mock provider response 34 may be in an XML name space format such as the example below:

Mock Provider Response (XML Name Space Format):
<polSearchResponse>
  <Policy>
    <num>12-34-56</num>
    <effectiveDate>01032000</effectiveDate>
  </Policy>
</polSearchResponse>

In another embodiment, the mock provider response 34 may be in an XML name value pair format, such as the example below:

Mock Provider Response (Name-Value Pair Format):
<polSearchResponse>
  <Data>
    [Policy]
    num=12-34-56
    effectiveDate=01032000
  </Data>
</polSearchResponse>

After receiving the mock provider response 34, the enterprise service bus 13 will then process the mock provider response 34 and perform a transformation on the mock provider response 34 to create a modified provider response 35. In one embodiment, the enterprise service bus 13 receives the mock provider response 34 in XML name space or name-value format and converts the mock provider response 34 into XML name space format for processing by mock consumer/provider unit 31.

At step 48, the mock consumer/provider unit 31 may receive the modified provider response 35 from the enterprise service bus 13.

At step 49, the mock consumer/provider unit 31 may analyze the modified consumer request 33 and the modified provider response 35 and generate test results. The test results may include validations of predetermined scenarios to ensure that requests and responses are transformed correctly. These messages (e.g. the modified consumer request 33 and the modified provider response 35) are evaluated, deconstructed, parameterized, and finally analyzed against expected values. Tests are then created to analyze and compare the captured parameters, and expected values. The tests created are then utilized by the developers to document the requirements, and follow test driven development practices.

Utilizing the system 30 and method 40 of FIGS. 3 and 4, a developer may no longer be dependent on the consumers/clients or providers for development. The framework allows the developer to simulate the client and provider behavior, so that attention can be placed on enterprise service bus 13 development. The framework facilitates the ability to simulate both consumer inquiry and provider responses so that the enterprise service bus 13 can be configured to the expectations as defined by the requirements.

With the described framework, the developer can unit test the enterprise service bus 13 modified request 33 separately from the enterprise service bus 13 modified provider response 35. Thus, the framework provides the opportunity to ensure that the configuration changes made to the enterprise service bus 13 meet predefined requirements by implementing automated tests that execute against the enterprise service bus 13. The automated tests, which can be run either via local workstation or remotely, can be targeted to a specific confirmation made to the enterprise service bus 13.

Using the described framework, a developer can also test the modified provider response transformation separately. The developers can compare against locally stored expected result files, and validate down to the individual XML node. An XML node is associated with the data between an XML namespace designation (e.g. John in the example <FName>John</FName>) exactly what is being created from the enterprise service bus 13.

By increasing the specificity of the tests on the enterprise service bus 13, the more finely documented the requirements of the enterprise architecture can become. For example, a user may be able to test simple data changes such as date format, to more complicated scenarios such as the calculation of tax at a state level.

In utilizing a common test format for automated tests, the developer can immediately understand what any provided service is expected to do, eliminating expertise silos, and reducing risk to any specific project.

This framework drastically reduces the complexity of updating a service, or fixing defects because, after making a change, a user can run a test using the framework to validate whether the other areas of the services are impacted. Long term, unit tests can be submitted by the customers as the actual requirements.

In one embodiment, a user can provide test instructions that, when executed, causes the mock consumer/provider unit 31 to generate a plurality of mock consumer requests and mock provider responses. In one embodiment, the test instructions may include a table that includes each data element for each XML node in a mock consumer request 32 and mock provider request 34.

FIG. 5 depicts a block diagram of a mock consumer/provider unit 31 according to at least one embodiment of the invention. The mock consumer/provider unit 31 may be a computing device. The mock consumer/provider unit 31 may, in other embodiments, be any combination of processing devices such as workstations, servers, mainframe computers, notebook or laptop computers, desktop computers, PDAs, mobile phones, wireless devices, set-top boxes, or the like.

In the depicted embodiment, the mock consumer/provider unit 31 includes a user interface 51, a processor 52, a display 53, storage 54, memory 55, and a network adapter 56 connected to a bus 57. The bus 57 facilitates communication between the processor 52 and other components of the mock consumer/provider unit 31, as well as communication between other components. Processor 52 may include one or more system central processing units (CPUs) or processors to execute instructions. The processor 52 may utilize storage 54, which may be non-volatile storage such as one or more hard drives, tape drives, diskette drives, CD-ROM drive, DVD-ROM drive, or the like. The processor 52 may also be connected to memory 55 via bus 57, such as via a memory controller hub (MCH). System memory 55 may include volatile memory such as random access memory (RAM) or double data rate (DDR) synchronous dynamic random access memory (SDRAM), for example. Other embodiments may include one or more of the components depicted in FIG. 3.

The user interface 51 may connect the processor 52 with user interface devices such as a mouse or keyboard. The user interface 51 may also connect with other types of user input devices, such as touch pads, touch sensitive screens, electronic pens, microphones, etc. The bus 57 may also connect the processor 52 to a display 53, such as an LCD display or CRT monitor, for example.

Network interface 56 facilitates communication between mock consumer/provider unit 31 and other external devices, such as the enterprise service bus 13, via one or more protocols such as HTTP, as described in more detail above.

In one embodiment, the system 30 and method 40 includes one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A system, comprising:
 a testing unit, the testing unit including:
  memory operable to store at least one program;
  at least one processor communicatively coupled to the memory, in which the at least one program, when executed by the at least one processor, causes the at least one processor to:
  receive test instructions;
  generate a mock consumer request for a web service from a web server and a mock provider response based on the test instructions;
  transmit the mock consumer request to a tested unit;
  receive a modified consumer request from the tested unit; and
  transmit the mock provider response to the tested unit.

2. The system according to claim 1, wherein the mock consumer request includes a modified header, and wherein the modified header includes a port and internet protocol address of the testing unit that generated the mock consumer request.

3. The system according to claim 2, wherein the tested unit is adapted to extract the modified header information from the mock consumer request and wherein the modified request is received by the testing unit based on the modified header information.

4. The system according to claim 1, wherein the at least one program further causes the at least one processor to:
 generate a listener for the modified consumer request received from the tested unit.

5. The system according to claim 1, wherein the at least one program further causes the at least one processor to:
 receive a modified provider response from the tested unit.

6. The system according to claim 1, wherein the tested unit is an enterprise service bus.

7. The system according to claim 1, wherein the at least one program further causes the at least one processor to:
 generate a plurality of mock consumer requests and a plurality of mock provider responses based on the test instructions and a predefined data table.

8. A computer-implemented method, comprising:
 receiving test instructions;
 generating a mock consumer request for a web service from a web server and a mock provider response based on the test instructions;
 transmitting the mock consumer request to a tested unit;
 receiving a modified consumer request from the tested unit; and
 transmitting the mock provider response to the tested unit.

9. The method according to claim 8, wherein the mock consumer request includes a modified header, and wherein the modified header includes a port and internet protocol address of a testing unit that generated the mock consumer request.

10. The method according to claim 9, wherein the tested unit is adapted to extract the modified header information from the mock consumer request and wherein the modified request is received by the testing unit based on the modified header information.

11. The method according to claim 8, further comprising:
 generating a listener for the modified consumer request received from the tested unit.

12. The method according to claim 8, further comprising:
 receiving a modified provider response from the tested unit.

13. The method according to claim 8, wherein the tested unit is an enterprise service bus.

14. The method according to claim 8, further comprising:
generating a plurality of mock consumer requests and a plurality of mock provider responses based on the test instructions and a predefined data table.

15. A non-transitory computer readable storage medium having stored thereon computer-executable instructions which, when executed by a processor, perform a method, the method comprising:
receiving test instructions;
generating a mock consumer request for a web service from a web server and a mock provider response based on the test instructions;
transmitting the mock consumer request to a tested unit;
receiving a modified consumer request from the tested unit; and
transmitting the mock provider response to the tested unit.

16. The non-transitory computer readable storage medium according to claim 15, wherein the mock consumer request includes a modified header, and wherein the modified header includes a port and internet protocol address of a testing unit that generated the mock consumer request.

17. The non-transitory computer readable storage medium according to claim 16, wherein the tested unit is adapted to extract the modified header information from the mock consumer request and wherein the modified request is received by the testing unit based on the modified header information.

18. The non-transitory computer readable storage medium according to claim 15, the method further comprising:
generating a listener for the modified consumer request received from the tested unit.

19. The non-transitory computer readable storage medium according to claim 15, the method further comprising:
receiving a modified provider response from the tested unit.

20. The non-transitory computer readable storage medium according to claim 15, wherein the tested unit is an enterprise service bus.

21. The non-transitory computer readable storage medium according to claim 15, the method further comprising:
generating a plurality of mock consumer requests and a plurality of mock provider responses based on the test instructions and a predefined data table.

\* \* \* \* \*